United States Patent [19]
Quate et al.

[11] 3,875,550
[45] Apr. 1, 1975

[54] ELECTRONICALLY FOCUSED ACOUSTIC IMAGING SYSTEM AND METHOD

[75] Inventors: Calvin F. Quate, Los Altos Hills; James F. Havlice, Menlo Park; Gordon S. Kino, Stanford, all of Calif.

[73] Assignee: Board of Trustees of Leland Stanford Junior University, Stanford, Calif.

[22] Filed: July 16, 1973

[21] Appl. No.: 379,760

[52] U.S. Cl................ 340/5 MP, 340/6 R, 340/15, 333/29
[51] Int. Cl. ... G01v 1/00, H04b 13/00, H04r 15/00
[58] Field of Search........ 333/29, 30 R, 72; 340/6 R, 340/15, 5 MP; 310/8.1, 9.8, 343/17.2 RC

[56] References Cited
UNITED STATES PATENTS

| | | | |
|---|---|---|---|
| 3,104,377 | 9/1963 | Alexander et al. | 310/9.8 |
| 3,311,870 | 3/1967 | Brohe et al. | 340/6 R |
| 3,686,572 | 8/1972 | Guilhem et al. | 343/17.2 PC |
| 3,770,949 | 11/1973 | Whitehouse et al. | 310/8.1 |
| 3,774,201 | 11/1973 | Collins | 343/17.2 PC |
| 3,786,504 | 1/1974 | Collins | 343/17.2 PC |

*Primary Examiner*—Maynard R. Wilbur
*Assistant Examiner*—T. M. Blum

[57] ABSTRACT

A system and method for scanning an array of acoustic transducers. A plurality of mixers are provided, one for each of the acoustic transducers. An acoustic delay line having a plurality of surface wave taps, one for each of the mixers, is also provided. One of the plurality of acoustic transducers and one of the surface wave taps are coupled to each of the mixers. In accordance with one embodiment, a signal is propagated down the acoustic delay line which has a pulse width less than the spacing between the surface waves taps so that only one mixer at a time has the delay line signal applied thereto. If a transducer signal and a delay line signal coexist at one of the mixers an output signal at the sum and/or difference frequency of the two signals is generated and detected. In accordance with another embodiment the delay line signal has a pulse width such that the signal is simultaneously applied to all of the surface wave taps and hence to all of the mixers. The spacing between the surface wave taps is even so that there is a linear phase variation among the delay line signals applied to the various mixers. The signals across the mixers are summed so that substantially no output is coupled out of the mixers until the frequency of the delay line signal is adjusted such that the linear phase variation of its signals applied to the mixers cancels the phase variation of the signal received by the transducer array. The system thus can function as a phase detector.

44 Claims, 10 Drawing Figures

FIG. 9

| PHASE IMAGING TECHNIQUE | AMPLITUDE OF SURFACE WAVE | FREQUENCY OF SURFACE WAVE | RESULTANT-IMAGE FOR AN OBJECT $A = e^{j\phi(x)}$ |
|---|---|---|---|
| DARK FIELD | | | $|A|^2 \approx \phi^2$ |
| SCHLIEREN | | | $|A|^2 \approx \dfrac{\phi^2}{2}$ |
| PHASE CONTRAST | | $f_0$ | $|A|^2 \approx 1 + 2\phi$ |

ELECTRONICALLY FOCUSED ACOUSTIC IMAGING SYSTEM AND METHOD

BACKGROUND OF THE INVENTION

This invention pertains to a method and system for scanning an array of transducers. In particular, this invention pertains to a system and method for scanning transducers in which no elaborate switching system is required.

Systems and techniques are available for scanning a transducer array. Typically, scanning of a transducer array is accomplished through complicated switching arrangements which sample in turn the electrical output of each of the transducers. Further, even though linear transducers are available which preserve both the phase and intensity information of an incoming signal, such as acoustic or microwave transducers for example, scanning systems have only been directed towards detecting the intensity information, with there being no convenient way to preserve the phase information.

OBJECTS AND SUMMARY OF THE INVENTION

Accordingly, it is an object of this invention to provide a method and system for scanning a transducer array.

It is another object of this invention to provide a method and system for scanning a transducer array in which only one output circuit is required for a plurality of transducers.

It is another object of this invention to provide a method and system for electronically processing amplitude and phase information from linear detectors.

It is another object of this invention to provide a system and method for imaging acoustic or microwave sources and the like utilizing electronic elements rather than lenses.

It is another object of this invention to provide a method and system for imaging acoustic or microwave sources and the like in which the imaging capability of the system can be varied.

It is another object of this invention to provide a method and system creating an electronic lens useful for either receiving or transmitting focused acoustic and microwave images and the like.

Briefly, in accordance with one embodiment of the invention there is provided a plurality of transducers. A plurality of mixers are provided, one for each of the transducers with the mixers being connected so that the signals present on each are summed at an output. A delay line is provided which has a plurality of taps, one for each of the mixers. Each of the delay line taps and each of the transducers is coupled to one of the mixers. A signal is propagated down the delay line so that output signals are produced in the mixers at the sum and-/or difference frequencies of the transducer signal and the delay line tap signal. The signals are generated only by those mixers across which both a signal from a transducer and a signal from a tap on a delay line coexist. In accordance with a further embodiment of the invention, the delay line is an acoustic delay line having a plurality of surface taps and the signal wave propagated down the delay line has its frequency linearly varied with time in order to produce a quadratic phase variation among the signals present at the surface wave taps of the delay line. At the same time the signals present at the mixers due to the transducer array vary quadratically in phase. When the quadratic phase variation among the signals from the surface wave taps exactly matches the quadratic phase variation of the signals received by the array of detectors, the sum of the signals existing across the plurality of mixers results in a large output at the sum or difference frequency. This large output corresponds to an image of a point source for example illuminating the detectors. The time at which the large output occurs corresponds to the spatial position of the point source while the rate at which the delay line signal frequency is changed corresponds to a particular focal length.

BRIEF DESCRIPTION OF THE DRAWINGS

FIG. 9 is a diagram illustrating the manner in which the amplitude and frequency of the delay line scanning signal can be varied for imaging phase objects.

DESCRIPTION OF THE PREFERRED EMBODIMENTS

Figure 1:
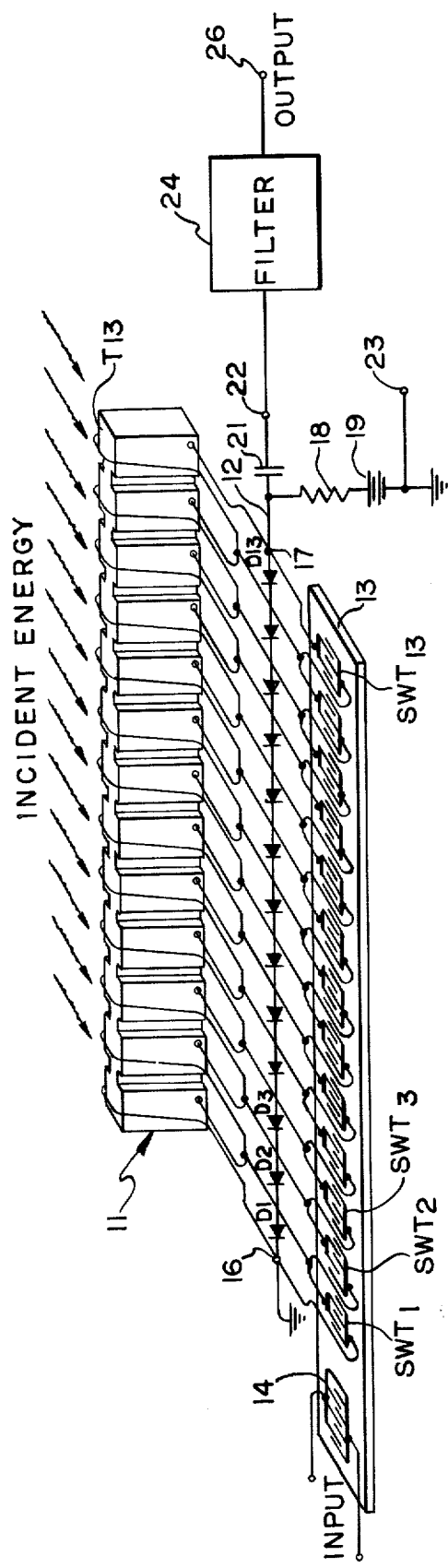
FIG. 1 is a schematic illustration of a scanning system and technique in accordance with the invention for scanning a plurality of transducer elements.

Referring now to FIG. 1 there is shown in schematic form a system for scanning a transducer array in accordance with one feature of the invention. Thus there is provided a transducer array comprising transducers T1, T2, T3, etc. through T13. The transducers T1 through T13 can be any kind of transducer for converting an energetic image into an electrical signal. For example, the system and method of this invention work quite well with acoustic or microwave transducers. Acoustic transducers are useful, for example, in underwater imaging systems that employ stationary transmitters and receivers. For an array of acoustic transducers the basic problem is to determine whether or not a sound wave is impinging on each element of the array. Typically, an acoustic lens which is similar to an optical lens is utilized to form an acoustic image of an object at the array surface so that then it is only necessary to determine the variation of sound or acoustic intensity across the elements of the array. The problem to be solved in scanning a transducer array is to convert a spatial distribution of information i.e., the intensity variation among the transducer elements, into a temporal variation. In mechanical switching techniques and other electronic scanning system this is accomplished through the use of a large number of logic elements. In accordance with the present invention, this conversion is affected through the use of a plurality of mixers 12 comprising diodes D1, D2, D3, etc. through D13 and the use of a delay line 13 having a corresponding plurality of taps SWT1, SWT2, SWT3, etc. through SWT13. In accordance with one embodiment of the invention, the delay line 13 is an acoustic surface wave delay line with the individual taps SWT1, etc. being surface wave taps which may consist of interdigital electrodes spaced along the acoustic surface wave delay line 13. The acoustic surface wave delay line 13 also has an input electrode 14 which may be an interdigital electrode to which a delay line signal is applied. The mixers or diodes are connected in a manner so that the signals appearing across the plurality of mixers are summed. The mixers may thus be connected in series or parallel. In the embodiment shown in FIG. 1 the mixers are connected in series with the series combination grounded at a terminal 16 and the other end of the series connected mixers or diodes at a terminal 17 being connected through, for example, a biasing resistor 18 to a biasing voltage source 19. This other end of the series connected diodes at terminal 17 is also connected through a coupling capacitor 21 to an output terminal 22 with the output being taken between the terminal 22 and a terminal 23 which may be at ground.

As shown in FIG. 1, the electrical outputs of each of the transducers T1 through T13 in the transducer array 11 is coupled across one of the diodes D1 through D13 in the series connected diodes 12. The corresponding electrical output from each of the surface wave taps SWT1 through SWT13 is also coupled across the corresponding one of the series connected diodes D1 through D13. A delay line input signal is coupled into the input electrode 14 of the acoustic surface wave delay line 13 and propagates along the length of the delay line 13, exciting each of these surface wave taps in turn. In accordance with the specific embodiment of the invention the surface wave delay line signal is a pulse of a particular frequency and is of such length that only one of the surface wave taps at a time is intercepted by the acoustic surface wave propagating down the length of the acoustic surface wave delay line 13. The delay line signal propagates down the acoustic surface wave delay line 13 and as it intercepts each tap an electrical signal is applied from that tap across the diode to which the tap is connected. If sound energy is present at the corresponding transducer in the transducer array, then the diode functions as a mixer so that the sum and difference frequencies of the transducer signal frequency and the delay line signal frequency are generated. The sum or difference frequency can be detected by connecting, for example, a filter network or tuned circuit 24 to the terminal 22 so that at the output of the filter or tuned circuit 24 at terminal 26 the sum or difference frequency appears in the form of a pulse. If there is no sound energy present at the transducer which is connected across a diode to which the delay line signal is being applied, then no output is generated. The surface wave delay line pulse continues to propagate down the delay line to the succeeding surface wave taps at each of which the process is repeated.

The image information present at the output terminal 26 can be presented or displayed by appropriate synchronization of the sweep of a cathode ray tube, for example, with the sweep rate of the cathode ray tube being determined by the propagation velocity of the surface wave pulse along the delay line 13. The image information can be viewed as either a sequence of pulses or can be displayed by intensity modulating the electron beam of the cathode ray tube with the information. Thus the arrangement of FIG. 1 scans a transducer array element by element through the use of received energy from a plurality of surface wave taps which are locally mixed with signals from the transducers in simple mixers, element by element. The generated sum or difference frequency provides the information content.

A scanning system such as shown in FIG. 1 may also be used as a phase detector. Assume for example that a uniform plane wave is incident on the transducer array so that each of the transducers is generating an electrical signal with a linearly varying phase and amplitude as the other transducers. Thus the phase of the transducer signals coupled across the mixer diodes varies linearly from diode to diode. A delay line signal of some appropriate frequency is then coupled into the input electrode 14 of the delay line 13 so that an acoustic surface wave is propagated down the length of the delay line 13. In accordance with this embodiment, the delay line signal must be of such a length that it simultaneously is applied to all of the surface wave taps. If the surface wave taps are evenly spaced along the extent of the acoustic surface wave delay line 13, then a linear phase variation exists among the delay line signals present on the plurality of surface wave taps. If the linear phase variation of the delay line signal as present at the plurality of surface wave taps does not match the linear phase variation of the signal exciting the transducer array, then substantially no output will be produced at output terminal 26 since output terminal 26 is the sum of the signals existing across all the plurality of mixer diodes and they are all out of phase with one another. If the frequency of the delay line signal is then adjusted or varied, at some particular delay line signal frequency the linear phase variations of the signals across the plurality of surface wave taps will match the linear phase variations of the signals produced by the plurality of corresponding transducers.

If the uniform plane wave is incident on the detector array normal thereto, then a synchronous relationship exists in the linear phase distribution along the elements of the detector array. That is, the signals at the plurality of detectors all have the same phase. If, on the other hand, the uniform plane wave is incident on the detector array at some other angle, the phase of the signals along the elements of the detector array will not be all the same, but will vary according to a linear relationship related to the angle of incidence. For the synchronous case, as the frequency of the delay line signal is varied, there will be phase matching between the surface wave tap signals and the transducer signals when a synchronous relationship exists among the surface wave tap signals. This will occur when the plurality of surface wave tap signals all have the same relative phase; that is, when there is an integral number of wavelengths between adjacent, evenly-spaced surface wave taps. When this occurs, since the signals across all the mixers are in phase, a large output is generated at terminal 26, with the output being the sum or difference frequency of the delay line signal and the uniform plane wave signal exciting the transducer array. For a non-synchronous signal distribution among the transducer signals, phase matching will correspondingly occur between the transducer signals and the surface wave tap signals when there is a corresponding non-synchronous linear phase relationship among the signals on the surface wave taps. This will occur at some non-synchronous frequency of delay line signal, which frequency corresponds to the non-synchronous angle of incidence of the uniform plane wave on the detector array.

What has been thus far described is an improved scanning technique and system for scanning the intensity information which may be present on an array of linear transducers such as acoustic transducers, for example. A system and technique has also been discussed above which functions as a phase detector.

Taking the case of an acoustic detector array as an example, merely scanning the intensity information on the acoustic detectors serves the same function as photographic film in recording an optical image. Photographic film merely records the light intensity which falls on a given element of the film. An optical image of an object is formed by using the photographic film in combination with an optical lens. The optical lens collects the optical energy falling on its entire surface and bends the ray paths originating from a source point in such a way that the energy is directed toward a given point on the photographic film. At the same time the optical lens alters the phase in such a way that all rays arrive at this point with equal phase, regardless of which point they passed through on the lens surface. Thus the individual source points form corresponding points on the film and the recorded image is a faithful reproduction of the object. In just the same way as in optics, an "acoustic lens" is required to form an image at an acoustic detector array. In conventional prior art systems this acoustic lens comprises a plastic lens shaped similarly to an optical glass lens.

Figure 2:
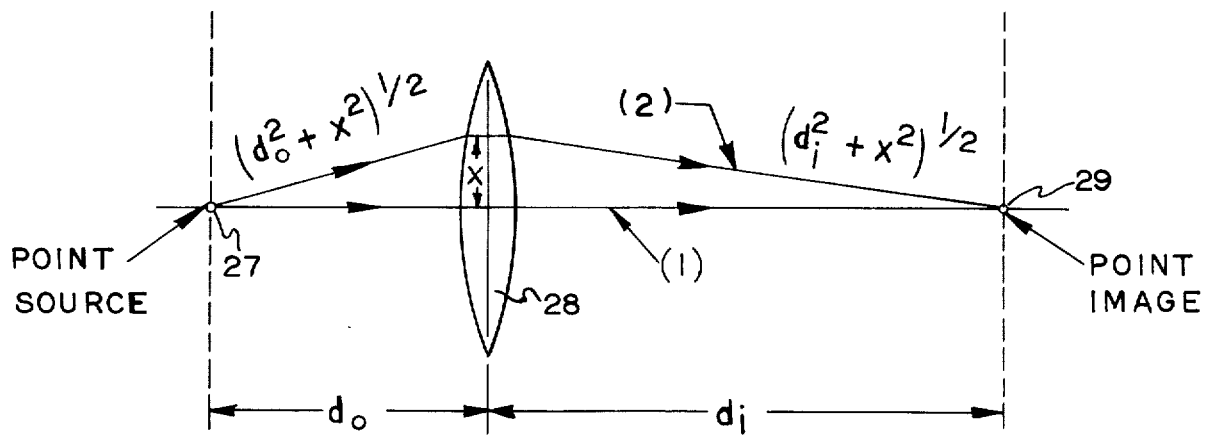
FIG. 2 is a schematic illustration of the imaging characteristics of an optical lens.

The action of an optical lens is usually explained by resorting to classical ray optics, and Snell's law, which itself is derived by determining the phase delay of a propagating wavefront. Because the phase velocity of an optical wave is less in the lens material than in air, a ray incident on the lens suffers a phase delay proportional to the thickness of the lens at each point. Consider for example the optical system shown in FIG. 2. A point source 27 is to be imaged by a lens 28 at a point 29. Two optical rays are shown in FIG. 2 which are (1) a ray passing through the axis of the lens, and (2) a ray passing through a point a distance $x$ from the lens axis. If the lens 28 were not present, the phase delays for the two rays would be $$(1) \quad \Phi_1 = \frac{2\pi}{\lambda_0}[d_0 + d_i]$$

$$(2) \quad \Phi_2 = \frac{2\pi}{\lambda_0}[(d_0^2 + x^2)^{1/2} + (d_i^2 + x^2)^{1/2}]$$

respectively, where $\lambda_0$ is the wavelength of the light rays. This latter expression can be simplified for values of $x$ much smaller than $d_0$ and $d_i$ (the so-called paraxial approximation) to:

$$(3) \quad \Phi_2 = \frac{2\pi}{\lambda_0}[d_0 + d_i + \frac{x^2}{2}(\frac{1}{d_0} + \frac{1}{d_i})]$$

It will be seen that ray (2) experiences an added amount of phase delay which is proportional to $x^2$.

The phase delay through the lens 28 compensates for this phase difference. The thickness of a lens of the correct focal length is decreased as $x$ increases in such a way that the phase shift, $\Phi_L$, introduced by the lens has a value $$(4) \quad \Phi_L = A - \frac{2\pi}{\lambda_0} \frac{x^2}{2}(\frac{1}{d_0} + \frac{1}{d_i}) = A - \frac{2\pi x^2}{\lambda_0 F}$$

where $f$ is the focal length of the lens and A is a constant for the lens 28. With this addition, the total phase shift from a point on the source to the corresponding image point is simply $$(5) \quad \Phi \cong (2\pi/\lambda_0)(d_0 + d_i) + A$$

This phase shift is independent of the parameter of $x$, and all points on the lens surface produce rays which arrive in phase at the image point on the image plane of the film in a camera.

Figure 3:
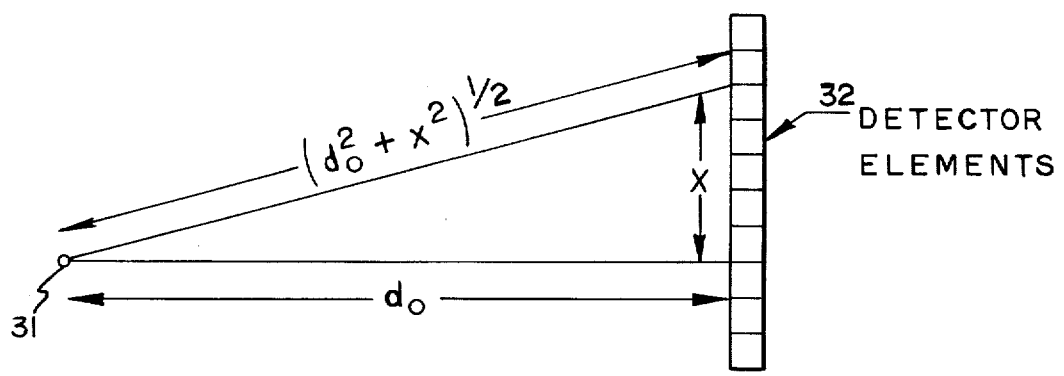
FIG. 3 is a schematic illustration of a point source of acoustic energy illuminating a detector array.

Similar considerations apply in attempting to image an acoustic point source or microwave point source. Consider a point source of acoustic radiation 31 and allow it to impinge on an array of piezoelectric detectors 32 a distance $d_0$ from the source. If $x << d_0$, the phase at a point $x$ on the detector as illustrated in FIG. 3, varies directly as $$(6) \quad \Phi_1 = \omega_s t - (2\pi/\lambda_0)(d_0^2 + x^2)^{1/2} \approx \omega_s t - \frac{2\pi(d_0}{0} + \frac{x^2)}{2d_0}$$

where $\omega_s$ is the radian frequency of the acoustic wave.

As before it can be seen that the phase is a quadratic function of the parameter x. It is this term which must be compensated in order that such element of the detectors 32 will contribute components which are "in phase" to an output signal.

What is required is an array of transducers or linear detectors for converting acoustic or microwave signals incident thereon into electrical signals in which the phase information is preserved. Thus for an acoustic signal for example, an array of piezoelectric elements or detectors are provided to convert the incident acoustic signals to electrical signals. Then, in order to image the point source it is necessary to add an electrical phase shift to the signal generated by each of the transducer or detector elements that just compensates the $2\pi/\lambda_0 (d_0 + x^2/2d_0)$ term that arises from the different path lengths. In principle this could be done with a digital computer after first converting the output information of the transducers into digital information. Utilizing a digital computer for this purpose would, of course, result in a very expensive imaging system.

Consider again the scanning system shown in FIG. 1. The scanning system shown in FIG. 1 can be utilized as an electronic lens to image a point source of acoustic or microwave energy. Assume as an example that there is a point source of acoustic energy a distance $d_0$ in front of the transducer array of transducer T1 through T13. In the paraxial approximation ($d_0 >> x$) the amplitude across the transducer array is nearly uniform but the phase varies quadratically with the parameter $x$, which is the $x$ lateral extent of the transducer. Since the array of acoustic transducers preserves the phase of the incident acoustic information, the output electrical signals from the acoustic transducers have a quadratic phase variation. As discussed before in connection with the scanning system shown in FIG. 1, the signals from the transducers can be mixed in a series of mixers with signals from the surface wave taps of the surface wave delay line 13. The signals on the mixers are summed to provide an output at a terminal 26. If the phases of the delay line signal at the surface taps exactly cancel the quadratic variations of the phase of the corresponding received signals from the transducer array, the summed output of the mixers at terminal 26 of the scanning system becomes very large. Either the sum or difference frequency generated by the mixers can be detected in the large output by an appropriate filter 24 or the like. If the phases of the signals at the surface wave taps of the delay line do not cancel the quadratic phase variation of the signals from the transducers, the output of the scanning system is very weak due to this phase mismatch. The problem is then how to produce a quadratic phase variation among the signals present at the plurality of the surface wave taps SWT1, SWT2, etc. One way to produce such a phase variation among the signals of the surface wave taps is to vary the spacing between the surface wave taps. That is, if a constant frequency signal is applied to the delay line 13 by way of the input electrode 14, and the surface wave taps are evenly spaced along the extent of the delay line 13, then the phase variation of the delay line signal (which is a long enough signal to simultaneously be applied to all the surface wave taps) is a linear phase change from surface tap to surface tap. However, if the surface wave taps are non-uniformly spaced with respect to each other in accordance with some linear function, then a quadratic variation in phase results between the various surface wave taps. For example, the spacing between surface wave taps SWT1 and SWT2, might be two units, with the spacing between SWT2 and SWT3 three units, the spacing between SWT3 and SWT4 four units, etc., to the point where the spacing between SWT12 and SWT13 would be 13 units of measurement. This linear variation in spacing between the surface wave taps produces a quadratic phase shift among the delay line signals at the surface wave taps. The time at which the large output occurs, which indicates that the quadratic phase variation at the surface wave taps exactly match the quadratic phase variations of the received signals from the transducers, is indicative of the spatial position of the source exciting the transducers. The surface wave frequency along with the linear variation of spacing of the surface wave taps corresponds to a particular focal plane or position in front of the acoustic array. If the surface wave frequency is varied a different focal plane is imaged.

In accordance with another embodiment of the invention, the general type of scanning system shown in FIG. 1 can be utilized as an electronic lens and further can be utilized as a lens having a focal length which is electronically adjustable. As mentioned before, in order to image a source of acoustic energy for example, through use of a scanning system as shown in FIG. 1, it is necessary that there be a quadratic phase variation among the signals present at the delay line taps which corresponds to the quadratic phase term in the signals applied to the mixers from the acoustic transducers. As described above, this quadratic phase variation can be produced by nonuniformly spacing the surface wave taps along the surface of the delay line.

If the delay line signal coupled then to the input electrode 14 of the delay line 13 is a constant frequency, then as discussed before, the phase shift among a plurality of evenly spaced surface wave taps is a linear function of $x$. The acoustic delay line can serve, however, to transform a function which varies linearly with time at the input as $\omega t$ to a function which varies with both time and distance as $\omega(t - x/v)$ where $x$ is the distance along the delay line and $v$ is the propagation velocity of the delay line signal. Thus, if the delay line signal coupled to the input is a signal with a frequency which varies linearly with time, as $\omega = \omega_1 + \mu t$, the phase varies quadratically. With such an input the phase of the travelling delay line wave then becomes $$(7) \quad \psi_m = [\omega_1 + \frac{\mu}{2} (t - \frac{x}{v})] [t - \frac{x}{v}]$$

which can be expressed as $$(8) \quad \psi_m = \omega_1 (t - \frac{x}{v}) + \frac{\mu}{2} (t^2 - \frac{2xt}{v} + \frac{x^2}{v^2})$$

Thus the phase of a transducer signal at a point a distance $x$ along the detector or transducer array varies as given by equation (6). The phase variation along the acoustic delay line with an input signal of the form $\omega = \omega_1 + \mu t$ gives a phase variation such as expressed in equation (8). The value of $\mu$ (the frequency sweep rate) can be adjusted so that the $x^2$ term in equation (8) just cancels the $x^2$ term in equation (6). This is equivalent to adjusting the focal length of a lens. In this manner an electronic equivalent of an optical lens is formed and a system is constructed for summing in-phase all the contributions from each element of the transducer array.

With the technique and system discussed above, certain conditions have to be satisfied for the signals across the mixers to have a phase correspondence so that the sum of the signals across the mixers results in a large output signal. First of all, the chirp rate $\mu$ at which the delay line frequency is changed must be of such a value that the phase variation of the signals at the surface wave taps match the phase variations of the transducer array signals. Secondly, the spatial position of the chirp frequency signal along the delay line as determined by the surface wave propagation must be at the proper place.

The delay line chirp frequency signal must, of course, have a pulse width of at least as long as the delay line so that it simultaneously exists at all the surface wave taps along the delay line. Further, in order to scan the spatial positions (in one dimension) at a particular focal plane, the delay line signal should be twice as long as the delay line. Thus, after the delay line chirp frequency signal exists along the extent of the delay line, by having the delay line chirp frequency signal of a further width so as to enable the signal at one end of the delay line to propagate down to the other end of the delay line, the evenly spaced surface wave taps are sequentially exposed to the various quadratic phase distributions corresponding to various spatial positions in front of the transducer array. Since the delay line chirp frequency signal is propagated down the delay line, there will be a phase correspondence between the delay line signals and the transducer signals for only the short time that the delay line chirp frequency signal is in a particular position corresponding to the spatial position of a source of energy exciting the tranducers. Hence the time at which large outputs occur (indicating phase correspondence between the surface wave tap signals and the transducer array signals) corresponds to the spatial position of the point source being imaged. By changing the chirp rate $\mu$, different focal positions in front of the transducer array can be imaged.

It can be shown by a more general mathematical treatment that a line source at $x = x_0$ gives rise to an output signal from the scanning system such as shown in FIG. 1 which is a Dirac $\delta$ function at a time $t = x_0/v$. Thus in accordance with the system and method of the invention points are interrogated on an object by scanning them at a velocity $v$, the velocity $v$ being the propagation velocity of the acoustic wave down the delay line. The output from the system is observed near a frequency $\omega_1 + \omega_s$, and the travelling acoustic surface wave along the delay line acts like the scanning beam in a cathode ray tube.

Thus an electronically variable electronic lens is formed for imaging any kind of energetic energy source for which linear detectors are available, such as acoustic sources or microwave sources.

The above description has considered the imaging method and system of this invention from the stand point of a receiver, i.e., for forming an electronic or electrical signal completely descriptive of point sources of acoustic or microwave energy. The same system and technique can be used for transmitting focused acoustic or microwave energy for example. To transmit focused acoustic energy, for example, to a point in space in front of the transducer array 11 shown in FIG. 1, essentially the same circuitry is utilized. That is, a chirp frequency signal is introduced into the input electrode 14 of delay line 13 so that a signal is propagated down the length of the delay line 13 with a quadratic phase variation among the signals present at the plurality of surface wave taps. At some appropriate instant of time while the surface wave exists at all of the plurality of surface wave taps, a signal of some appropriate frequency is introduced via the terminal 22 and coupled across all of the diode mixers. The mixers form sum and difference frequencies of the signal coupled in through the terminal 22 and the signals present at the surface wave taps across which the respective diodes are connected. The respective sum or difference frequencies are coupled to the individual elements in the transducer array 11 so that each of the individual elements is excited by its respective signal to radiate acoustic energy. The phase variation among the acoustic energy radiated by individual transducer elements varies quadratically so that the acoustic energy is focused at a point in space in front of the transducer array 11. The particular spatial position at which the acoustic energy is focused is dependent upon the time at which the electrical signal is coupled into terminal 22 with respect to the position of the chirp frequency signal being propagated down the length of the delay line (and hence the quadratic phase distribution of the delay line signal among the surface taps). The focal point or plane in front of the transducer array 11 at which the acoustic energy is focused is dependent as before on the chirp frequency rate of the signal propagating along the delay line 13.

Thus the system and technique described above can be used as an electronic lens for either transmitting focused acoustic or microwave energy and the like, or alternatively can receive acoustic or microwave energy from an energy source in space and convert it into a scanned electronic image in which phase information is scanned so that the spatial position of the source is completely defined. A suitable microwave transducer array is achieved by combining a plurality of microwave antennas into an array. Such antennas are called beacon antennas and are available from the Watkins-Johnson Corporation of Palo Alto, Calif.

The particular embodiment of the invention described in connection with FIG. 1 is one in which a plurality of series connected mixers are provided and in which an array of separate transducers is provided. The invention is equally applicable to other forms, however, in which the large area tranducers rather than an individual transducer array is utilized and in which the mixers are connected in parallel for summing the signals present at the plurality of mixers rather than being connected in series. Further, although the invention for the most part is described with respect to embodiments in which acoustic energy sources and acoustic transducers are utilized, it is equally applicable to any kind of energetic image for which linear detectors are available. These include, for example, microwave signals which could be utilized for radar.

In the specific embodiments disclosed herein the delay line used is an acoustic delay line having a plurality of surface wave taps. It is, of course, not necessary to the invention that an acoustic surface wave delay line be utilized. The principles of the invention are equally applicable to methods and apparatus embodying tapped magnetic or electric delay lines.

In the embodiment of the invention hereinbefore discussed the so-called paraxial approximation was made. This approximation assumes that the two dimensional extent of the detector array is quite small compared to the distance between the point source being imaged and the detector array so that the lateral extent of the detector array can be ignored. Utilizing the paraxial approximation results in a quadratic phase variation on the detector array, with a quadratic phase variation being introduced along the delay line to image the point source. As demonstrated, the quadratic phase variation can be introduced along the delay line through the use of a linear frequency chirp.

The paraxial approximation is just that: an approximation. The actual phase distribution across a detector array is not exactly quadratic. In the usual optical or acoustical case where spherical lenses are employed, this approximation leads to various aberrations. This in turn adversely affects the resolution of the system. If, in practising the present invention, an exactly linear chirp is utilized so that an exactly quadratic phase distribution results along the delay line, the usual aberrations are also present. However, in accordance with another embodiment of the invention, an exactly linear chirp frequency signal is not used on the delay line. It is a relatively simple matter to electronically generate whatever waveform for the delay line signal is required to give perfect phase matching without resorting to the usual paraxial approximation. This eliminates the limitations of aberration effects on image contrast and resolution. The perfect phase match can be successively approximated by a delay line signal having a frequency $\omega$ given by the following expansion.

$$(9) \quad \omega = \omega_0 + \mu t - \frac{1}{2} \frac{\lambda^2}{k d_0} t^2 + \frac{3}{8} \frac{\mu^2}{k^2 d_0^2} t^3 - \frac{5}{16} \frac{\mu^4}{k^3 d_0^3} t^4 + \ldots$$

where $\mu$ is the linear parameter required for the paraxial or first order approximation characterized by $$(10) \quad \mu = \frac{k v^2}{d_0}$$

Each successive term in equation (9) above gives a better and better phase match between the delay line signals and the transducer signals, thus further and further reducing aberrations.

Figure 4:
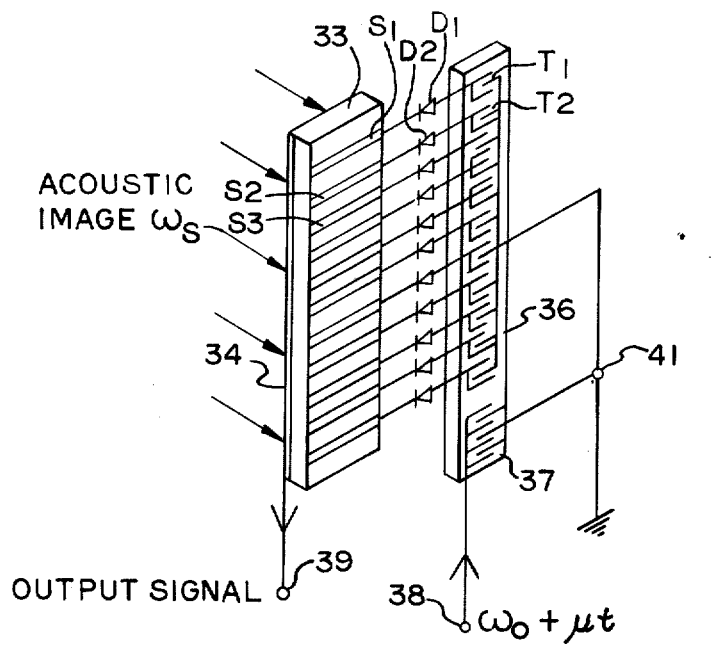
FIG. 4 is a schematic illustration of a technique and system comprising a one-dimensional electronic lens for imaging acoustic or microwave energy impinging on a detector array.

Referring now to FIG. 4, there is shown another embodiment of the invention illustrating some of these variations. The embodiment of FIG. 4 will be described with reference to a system for forming an acoustic lens for imaging acoustic sources or for transmitting a focused acoustic image when the system is used in a transmitting capacity. Thus in FIG. 4 there is provided an acoustic transducer 33 which is a piezoelectric material for example. An acoustic image signal of frequency $\omega_s$ is detected on this large piezoelectric plate or transducer 33. One side of the piezoelectric transducer 33 is coated with a metal film 34 and the other side has a plurality of metal stripes formed thereon indicated by the reference characters S1, S2, S3, etc. Each of the metal strips S1, S2, etc. is connected through a corresponding diode D1, D2, etc. to a corresponding tap T1, T2, etc. on an acoustic surface wave delay line 36. An input electrode 37 is provided on the acoustic delay line 36 for coupling a delay line signal into the delay line. This signal is present at a terminal indicated by reference numeral 38 and in accordance with the invention, for embodiments wherein the spacing between the surface taps T1, T2, etc. on the delay line is uniform, the delay line signal applied to terminal 38 is a sweep or chirp signal of the form $\omega_1 = \omega_0 + \mu t$ in order to produce a quadratic phase distribution among the signals at the surface taps. The output at a sum frequency $(\omega_0 + \mu t) + \omega_s$, for example, is taken between a terminal 39 connected to the metal conducting film 34 on one side of the piezoelectric transducer 33 and a terminal 41 connected to the opposite side of the interdigital transducers or surface wave taps T1, T2, etc. on the acoustic surface wave delay line 36. Thus in this particular embodiment the signals present on the plurality of mixers (diodes) are summed with the mixers in a parallel connection rather than in the series connection shown in FIG. 1. As the delay line signal propagates down the acoustic surface wave delay line 36, different spatial positions at the particular focal length $\mu$ (corresponding to the chirp frequency rate of the delay line signal) are scanned along the one dimension in front of the one dimensional acoustic transducer 33.

Figure 5:
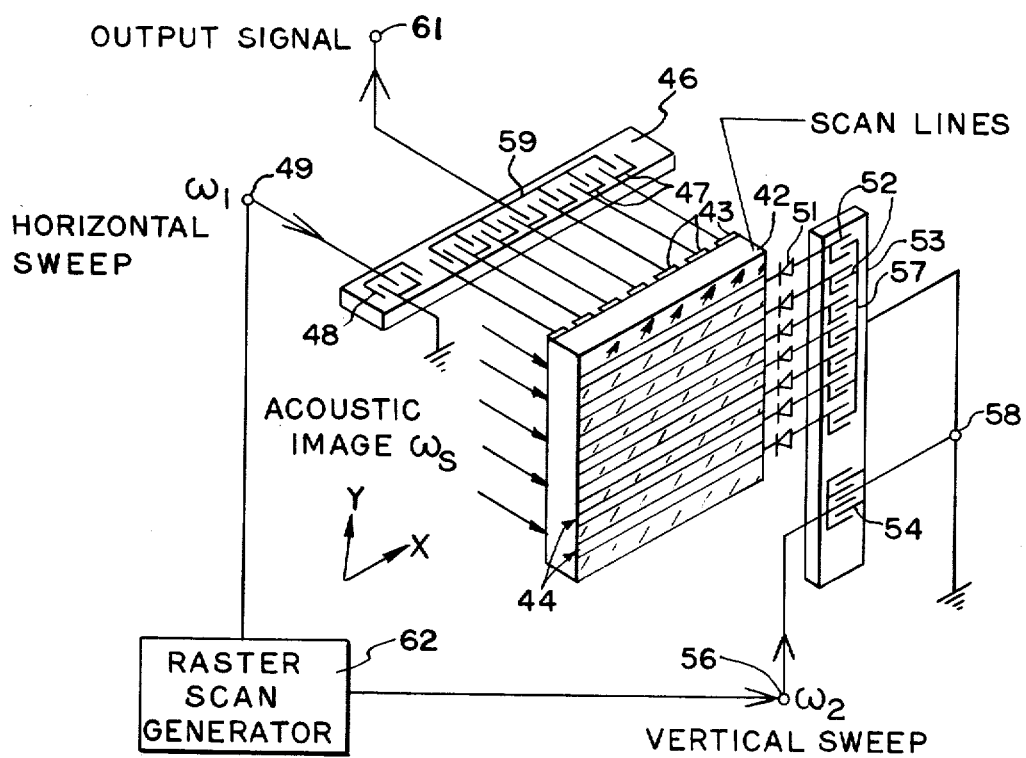
FIG. 5 is a sechematic illustration of a technique and system comprising a two-dimensional electronic lens for imaging acoustic or microwave energy impinging on a detector array.

Referring now to FIG. 5, there is shown a system in which the one dimensional scanning technique of FIG. 4 is extended to a two dimensional scanning technique and system. In FIG. 5 a two dimensional linear transducer 42 is provided. For example, this may be a piezoelectric transducer when it is acoustic images which are either being formed, received or transmitted. The large area piezoelectric transducer 42 has a plurality of parallel stripes of metal 43 deposited on one side thereof and has a second set of parallel metal stripes 44 deposited on the other side thereof at right angles to the set of parallel stripes 43. Each of the parallel stripes 43 is directly connected to a corresponding one of a plurality of surface wave taps 47 on an acoustic surface wave delay line 46. The acoustic wave delay line 46 also has an input electrode 48 connected to a terminal 49.

Each of the metal stripes 44 on the other side of the piezoelectric transducer 42 is connected through a corresponding one of a set of mixer diodes 51 to a corresponding one of a plurality of surface wave taps 52 on a second acoustic surface wave delay line 53. The acoustic surface wave delay line 53 also has an input electrode 54 to which a terminal 56 is connected. The acoustic surface wave delay line 53 has a terminal 57 formed thereon extending past the plurality of surface wave taps 52 and which is connected to a terminal 58, which in this instance is shown as being connected to ground. Similarly, the acoustic surface wave delay line 46 has an electrode 59 formed thereon extending past the plurality of surface wave taps 47 and which is connected to a terminal 61.

In the system shown in FIG. 5 a signal of frequency $\omega_1$ at $t = 0$ is applied through the terminal 49 to the acoustic surface wave delay line 46. In accordance with the invention the $\omega_1$ signal frequency linearly increases with time (chirp frequency) so as to produce a quadratic phase variation among the evenly spaced surface wave taps 47 as the delay line signal propagates down the acoustic surface wave delay line 46. This signal $\omega_1$ provides the scan of the piezoelectric transducer 42 along one dimension thereof. A similar signal of frequency $\omega_2$ at a time $\tau$ is introduced through the terminal 56 into the other acoustic surface wave delay line 53 and provides the scan of the piezoelectric transducer 42 in the opposite dimension. In accordance with the principles of this invention the frequency of the $\omega_2$ signal linearly increases with time (chirp frequency) so as to produce quadratic phase variation among the evenly spaced taps along the acoustic surface wave delay line 53. The mixing action of the diodes 51 generates sum and difference frequencies with a large output occurring when the phase of the signals on the delay line taps matches the phase of the transducer signals. The output is taken between terminals 61 and 58 and is an electrical signal having a carrier frequency equivalent to $\omega_1 + \omega_2 + \omega_s$. The output signal is modulated by the spatial information from the object giving rise to the image. A filter or the like may be utilized to separate the sum signal, for example, from the rest of the signals generated by the mixers. This output signal across the terminals 58 and 61 is generated from a point on the piezoelectric transducer with coordinates $x_0 = vt$, $y_0 = v(t - \tau)$. Thus a line at 45° to the $x$ axis is scanned as indicated by the scan lines shown across the piezoelectric substrate 42 in FIG. 5. This line is displaced by changing the delay time $\tau$ between the two delay line signals $\omega_1$ and $\omega_2$. Thus by sequentially changing this delay time between the two surface wave signals, as through use of a raster scan generator 62, a complete raster is traced out across the piezoelectric substrate 42.

In the arrangement shown in FIG. 5 it is necessary that the quadratic phase variations among the signals at the surface wave taps 47 on the delay line 46 vary in the same fashion as the phase variations along the surface wave taps 52 on the acoustic surface wave delay line 53 in order that a particular focal plane is imaged. Thus if the same chirp frequency rate is utilized in generating the $\omega_1$ and $\omega_2$ signals, the surface wave taps 47 must be spaced from each other a distance equal to the spacing between the surface wave taps 57. If, on the other hand, the surface wave taps 47 on delay line 46 are spaced one distance from one another and the surface wave taps 57 on the delay line 53 are spaced a different distance from each other, then the two chirp frequency rates of $\omega_1$ and $\omega_2$ must be adjusted accordingly.

Figure 6:
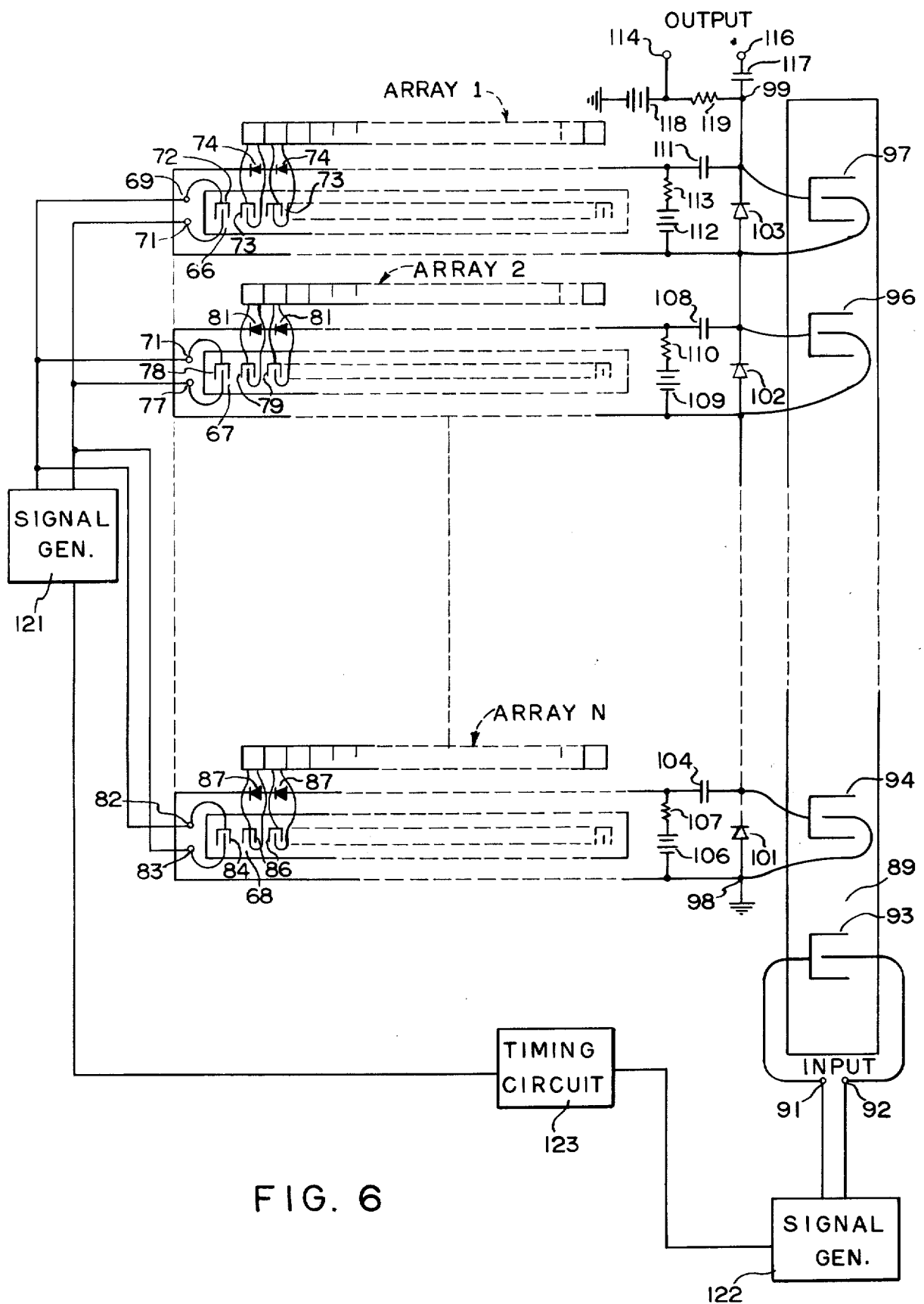
FIG. 6 is a schematic illustraion of another embodiment of a two dimensional imaging system in accordance with the invention.

In the embodiment of the invention shown in FIG. 5, a broad area transducer having two sets of orthogonally disposed conducting strips on its opposite sides is utilized in a two dimensional scanning or imaging technique and system. Referring now to FIG. 6, there is shown a schematic illustration of a two dimensional scanning or imaging arrangement in which a two dimensional array of discrete detector elements, such as individual piezoelectric transducers, is utilized. In the system of FIG. 6 there are provided N linear arrays of transducers, these being labeled Array 1, Array 2, etc. through Array N. In the actual physical construction the transducers are directly adjacent one another in a vertical sense as well as a horizontal sense, but are shown vertically separated in FIG. 6 in order to facilitate illustration of electrical connections. Each of the arrays comprises a plurality of linear detector elements, such as piezoelectric transducers for detecting acoustic signals. Associated with each of the detector or transducer arrays is a delay line having a plurality of taps. In accordance with one embodiment an acoustic surface wave delay line is utilized having a plurality of surface wave taps. Thus there is shown in FIG. 6 a surface wave delay line 66 associated with Array 1, a surface wave delay line 67 associated with Array 2, and so on, with a surface wave delay line 68 associated with array N. It should be understood that although only three detector arrays and associated delay lines are shown in FIG. 6, that there can be more than three horizontally extending arrays and associated delay lines.

Each of the acoustic surface wave delay lines has an input and a plurality of surface wave delay taps spaced along its length. There is provided in each delay line a surface wave tap for each of the individual transducer elements in the array with which the delay line is associated. The delay line 66 thus has input terminals 69 and 71 connected to an input electrode 72 and has a plurality of surface wave taps 73 spaced along its extent. A plurality of series-connected diodes 74 are provided with one of the surface wave taps 73 and a corresponding one of the transducer elements in the Array 1 being connected in parallel across one of the diodes.

In like manner, the delay line 67 has input terminals 76 and 77 connected to an input electrode 78 and has a plurality of surface wave taps 79 spaced along its extent. A plurality of series-connected diodes 81 are provided with one of the surface wave taps 79 and a corresponding one of the transducer elements in the Array 2 being connected in parallel across one of the diodes. Each of the detector arrays and associated delay lines has similar connection provisions. Therefore, the delay line 68 associated with Array N has input terminals 82 and 83 connected to an input electrode 84 and has a plurality of surface wave taps 86 spaced along its extent. A plurality of series-connected diodes 87 are provided with one of the surface wave taps 86 and a corresponding one of the transducer elements in the Array N being connected in parallel across one of the diodes 87. A signal generator 88 is provided for supplying the same input signal to the various delay lines.

In the embodiment of the invention illustrated in FIG. 6, there is also provided an additional tapped delay line 89, which in accordance with this embodiment is an acoustic surface wave delay line having a plurality of surface wave taps. The delay line 89 has a pair of input terminals 91 and 92, an input electrode 93, and a plurality of surface wave taps. In FIG. 6 three of the surface wave taps are shown, these being labeled 94, 96, and 97. A plurality of series-connected diodes are provided extending between terminals 98 and 99 with one of the surface wave taps on the delay line 89 being connected across one of the diodes. Thus in FIG. 6 the surface wave tap 94 is connected across a diode 101, the surface wave tap 96 is connected across a diode 102, and the surface wave tap 97 is connected across a diode 103.

In accordance with the invention, the series-connected diodes 87 associated with detector array N are connected through a coupling capacitor 104 across the diode 101. A biasing voltage source 106 and a biasing resistor 107 may also be provided for the diodes 87. In a similar manner, the series-connected diodes 81 associated with detector array 2 are connected through a coupling capacitor 108 across the diode 102. A biasing voltage source 109 and a biasing resistor 110 may also be provided for the diodes 81. Likewise, the series-connected diodes 74 associated with detector Array 1 are connected through a coupling capacitor 111 across the diode 103. A biasing voltage source 112 and a biasing resistor 113 may be provided for the diodes 74.

A pair of output terminals 114 and 116 are provided for the diodes 101, 102 and 103, with there being provided a coupling capacitor 117, a biasing voltage source 118 and a biasing resistor 119 for these diodes.

A signal generator 121 is provided for simultaneously applying a signal to the inputs of the surface wave delay lines 66, 67 and so on through delay line 68. A signal generator 122 is provided for applying a signal to the surface wave delay line 89 with there being a timing circuit 123 for controlling the time relationship between the signals generated by the signal generator 121 and the signal generator 122.

In operation, the signal generator 121 simultaneously applies a signal $\omega_1$ to the inputs of the plurality of horizontally disposed delay lines. As was the case for the previous embodiments of the invention, the signal $\omega_1$ is such that the phase variation produced among the taps of the delay line will match the phase variation among the detector or transducer elements in the associated detector array. In the general case, the signal $\omega_1$ has a frequency variation in time that is expressed by the expansion of equation 9. If the paraxial approximation is made a signal of the form $\omega_1 = \omega_0 + \mu t$ (a chirp signal) is applied to the delay lines to produce a quadratic phase variation among the delay line taps as discussed before. Mixing action occurs in the sets of series connected diodes 74, 81, and 87 in the same manner as described before. The output or mixed signals across each of the sets of series connected diodes 74, 81 and 87 is connected across one of the diodes 101, 102, 103, etc. The signal generator 122 applies a signal $\omega_2$ to the input of delay line 89. The signal $\omega_2$ (for the case of the paraxial approximation) is also of the form $\omega_2 = \omega_0 + \mu t$. The same chirp rate $\mu$ must be used for both $\omega_1$ and $\omega_2$, which corresponds to a particular focal length in front of the detector array. The focussing or scanning action of the delay lines 66, 67 and 68 and their associated sets of series-connected diodes can be referred to as a horizontal scan and the focussing or scanning action of delay line 89 and its associated diodes can be referred to as a vertical scan. The relative delay of the vertical scan to the horizontal scan determines what position in the object plane is being imaged; that is, the relative delay between $\omega_2$ and $\omega_1$. This relative delay is determined by timing circuit 123. By sequentially changing this relative delay through the use of timing circuit 123, successive positions in the object plane are imaged. The output of the systems of FIG. 6 is taken at output terminals 114 and 116. This output from the system is observed near a frequency $\omega_1 + \omega_2 + \omega_x$ where $\omega_x$ is the frequency of the energy exciting the transducer array. Corresponding difference frequencies are also produced. A filter or narrow bandwidth amplifier or the like can be utilized to separate out the desired signal.

Figure 7:
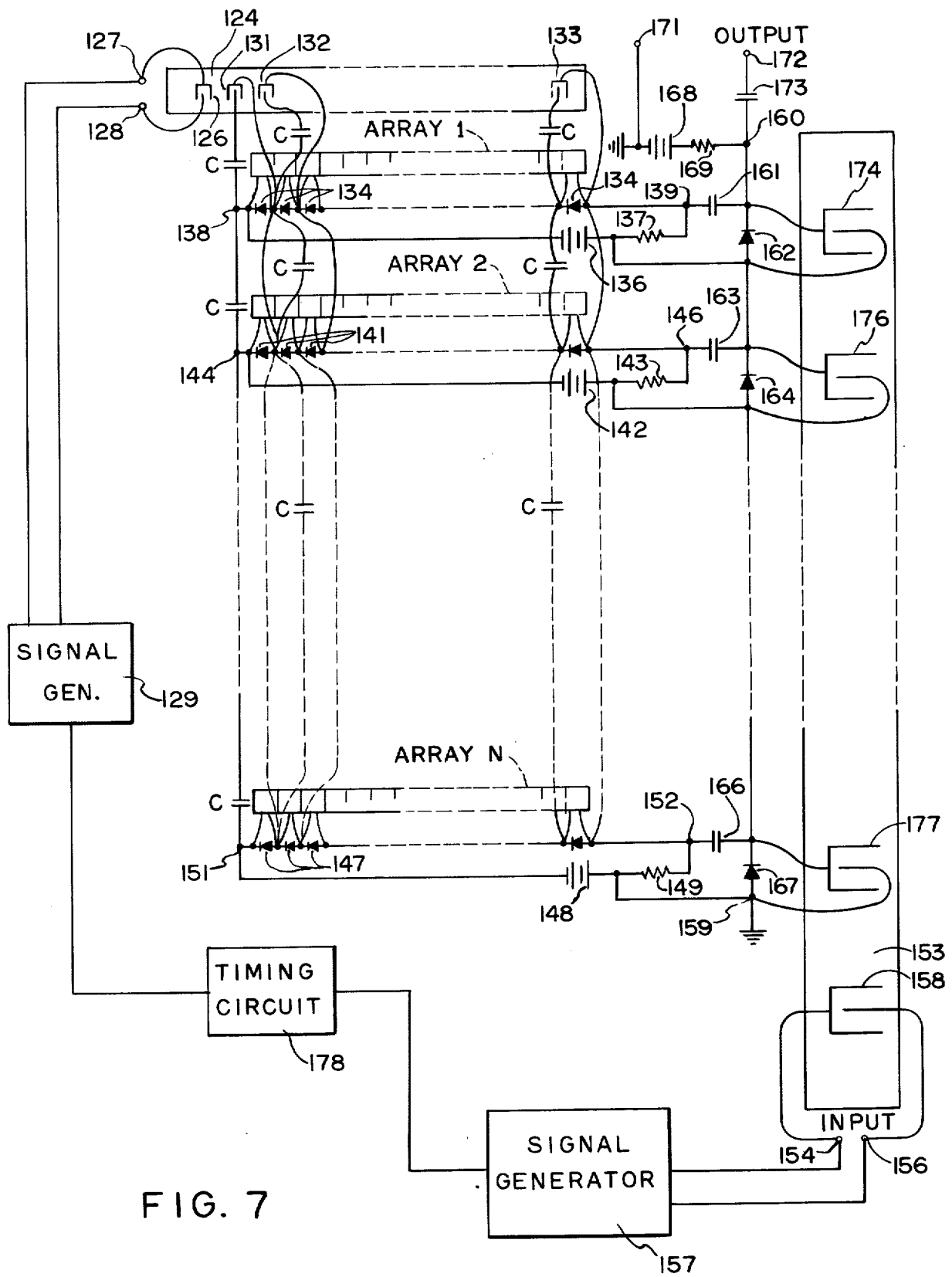
FIG. 7 is a schematic illustration of still another embodiment of a two dimensional imaging system.

In accordance with another embodiment of the invention, two dimensional scanning of a detector or transducer array can be accomplished through the use of only two delay lines. Referring now to FIG. 7, there is shown a schematic illustration of a two dimensional scanning or imaging arrangement in which a two dimensional array of discrete detector elements, such as individual piezoelectric transducers, is utilized. In the system of FIG. 6 there are provided N linear arrays of transducers, these being labeled Array 1, Array 2, etc. through Array N. On the actual physical construction the transducers are directly adjacent one another in a vertical sense as well as in a horizontal sense, but are shown vertically separated in FIG. 7 in order to facilitate illustration of electrical connections.

A single horizontal delay line 124 is provided. In accordance with a specific embodiment of the invention the delay line 124 is an acoustic surface wave delay line having an input electrode 126 connected through input terminals 127 and 128 to a signal generator 129, and also having a plurality of surface wave taps spaced along its length. There are provided as many surface wave taps on the delay line 124 as there are individual elements in one of the detector arrays. In FIG. 7 only three of the surface wave taps are specifically shown, being identified by reference numerals 131, 132 and 133. A set of series-connected diodes are provided for each of the horizontal detector arrays, with there being one diode for each of the individual elements in the array. Thus, series-connected diodes 134 are provided in association with Array 1, with the diodes together with a biasing voltage source 136, and a biasing resistor 137 coupled between terminals 138 and 139. Similarly, series-connected diodes 141 are provided in association with Array 2, with the diodes together with a biasing voltage source 142 and a biasing resistor 143 coupled between terminals 144 and 146. Likewise, series-connected diodes 147 are provided in association with illustrated Array N, with the diodes together with a biasing voltage source 148 and a biasing resistor 149 coupled between terminals 151 and 152.

Each of the surface wave taps on the delay line 124 is coupled across one of the diodes in every one of the sets of series-connected diodes. Thus the surface wave tap 131 is coupled across the first diode in Array 1, Array 2 and so on through Array N. Similarly, surface wave tap 132 is coupled across the second diode in every one of the arrays and so on with surface wave tap 133 coupled across the last diode in each of the arrays. Coupling capacitors are provided between each of the surface wave taps and the diodes to which it is coupled in order to provide isolation. Thus the coupling capacitors C are provided as illustrated in FIG. 7.

A single vertical delay line 153 is provided. In accordance with this embodiment the delay line 153 is an acoustic surface wave delay line having input terminals 154 and 156 to which a signal generator 157 is coupled. The input terminals 154 and 156 are connected to an input electrode 158 on delay line 153. There is provided a group of series-connected diodes between a pair of terminals 159 and 160. A separate diode is provided for each of the horizontal transducer arrays. Thus the diodes 134 associated with Array 1 are coupled through a capacitor 161 across a diode 162; the diodes 141 are coupled through a capacitor 163 across a diode 164; and so on with diodes 147 associated with Array N coupled through a capacitor 166 across a diode 167. A source of biasing voltage 168 and a biasing resistor 169 are provided for the diodes 162, 164 and 167, and output terminals 171 and 172 together with coupling capacitor 173 are provided for coupling an output out of the series-connected diodes 162, 164 and 167.

The delay line 153 has a plurality of surface wave taps. In accordance with the invention the delay line 153 is provided with as many surface wave taps as there are horizontal arrays of transducers; thus the delay line 153 is provided with N taps. Three of these surface wave taps are specifically illustrated in FIG. 7. Thus, surface wave tap 174 is provided coupled across diode 162; suface wave tap 176 is provided coupled across diode 164; and surface wave tap 177 is provided coupled across diode 167.

Operation of the apparatus shown in FIG. 7 is essentially the same as for the embodiment of FIG. 6 except that the same acoustic surface wave delay line 124 is utilized for all of the sets of series-connected diodes associated with the horizontally extending arrays. As before, the relative delay of the vertical scan (signal applied to delay line 153) with respect to the horizontal scan (signal applied to delay line 124) determines what position in the object plane is being imaged. A timing circuit 178 is provided for sequentially altering this relative delay so as to scan a two-dimensional plane in space.

In all of the preceding discussion attention has been concentrated on imaging objects in which information, such as acoustic information for example, was encoded as amplitude variations. In some very important applications, such as internal body imaging using acoustic waves, amplitude variations are very small and do not provide sufficient contrast for obtaining a good image. Such objects are known to those in the art as phase objects. Consider, for example, an acoustic phase object illuminated by a plane sound wave. The field transmitted is uniform in amplitude but varies in phase as $$(11) \ A(x) = \exp j \Phi (x)$$

In the usual imaging case, the amplitude variations of the output signal due to such an object are extremely small and usually not visible. To demonstrate this consider the phase function $\Phi (x)$ to be relatively small, i.e., $$(12) \ \Phi (x) \ll 2\pi$$

Then equation (11) can be approximated by $$(13) \ A(x) \cong 1 + j\Phi (x)$$

The power output of the imaging techniques of this invention is proportional to $|A(x)|^2$ so that $$(14) \ |A(x)|^2 \cong 1 + \Phi^2 (x)$$

Since $\Phi (x)$ is small, $\Phi^2 (x)$ is smaller and the contrast available is nearly nil. The problem is that the image appears against a very bright background, this being the 1 term in equation (14). consider what happens if this 1 term is suppressed. Then $$(15) \ |A(x)|^2 \cong \Phi^2 (x)$$

The output is still small but at least does not appear against the very bright background. The phase object now becomes very easily visible.

In optical imaging techniques, a method which is utilized in order to get rid of the bright background is to place a dark spot at the central order diffraction spot. This technique is generally known as dark field imaging. In accordance with this invention the dark field imaging technique is also applicable to the electronic imaging techniques and systems disclosed herein. To understand what is required, the Fourier transform of Equation (13) is taken $$(16) \ \tilde{A} (f_r) = f[A (x)]$$

where $\tilde{A} (f_r)$ is the spatial frequency content of the acoustic field and $f [\ ]$ represents a Fourier transform operation. Then $$(17) \ A (f_r) = 2\pi \ \delta (o) + f[j\Phi (x)]$$

Figure 8:
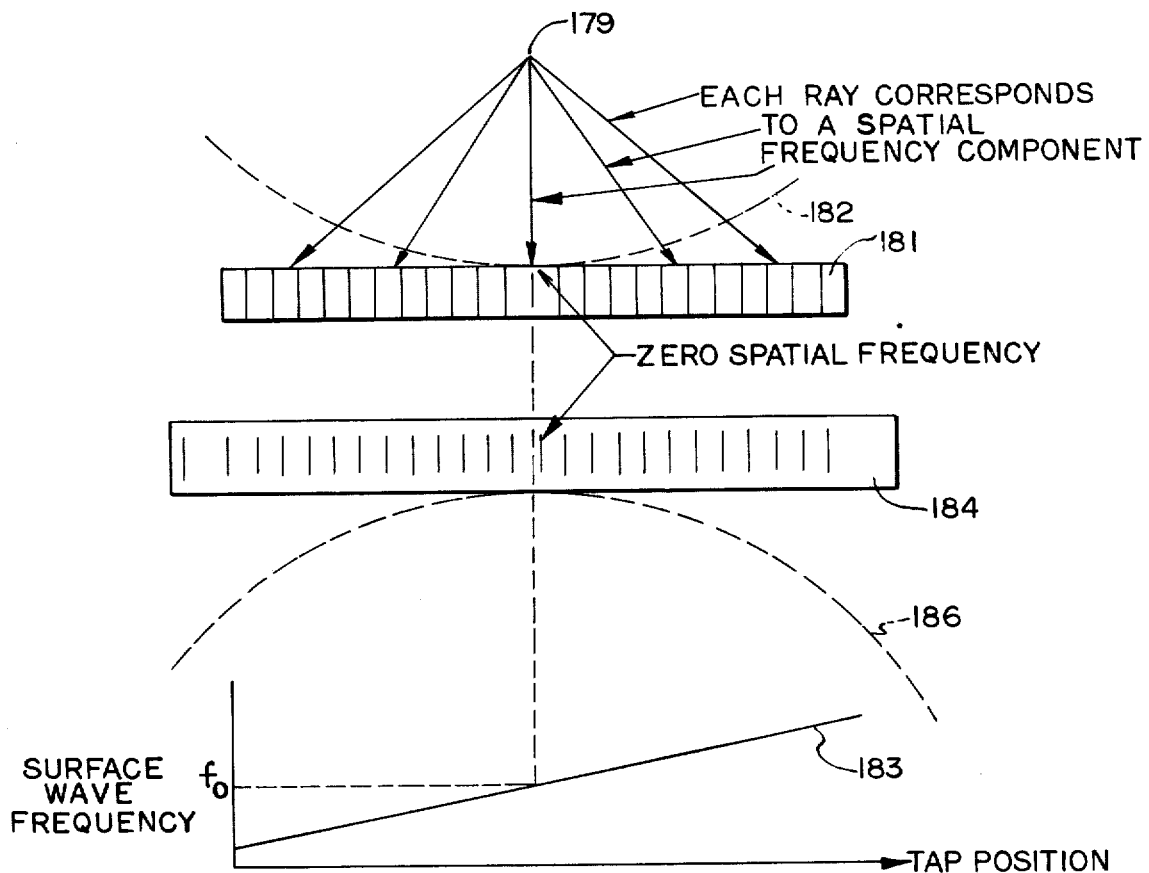
FIG. 8 is a diagram illustration that zero spatial frequency signals on a detector array correspond to the center frequency of the delay line signal.

It is clear from the first term of equation (17) that the frequency components of the bright background term are concentrated at zero spatial frequency. The implications of this for the techniques and systems of this invention can be seen by referring to FIG. 8. In FIG. 8 a point acoustic source 179 for example illuminates a transducer array 181 with a continuum of rays, a few of which are illustrated. The phase distribution of the rays is graphically illustrated by dashed line 182. The phase distribution of a chirp signal 183 along a surface wave delay line 184 is illustrated graphically by dashed line 186. Each ray (at different angles) from the point source 179 corresponds to a component of the spatial frequency spectrum, the zero frequency component being the one normal to the transducer array 181. The surface wave frequency signal propagated along the delay line which detects this zero frequency component is seen from FIG. 8 to be the center frequency of the surface wave scan signal. It follows, then, that the bright background may be eliminated by turning off the scan signal around its center frequency region $f_o$. Referring to FIG. 9, there is shown a plot of the amplitude and frequency characteristics of the delay line scan signal utilized for the case of dark field imaging. As can be seen from FIG. 9, the frequency is continuous but the amplitude of the scan signal is turned off about the center frequency $f_o$.

There are other optical techniques for imaging phase objects. These include, for example, phase contrast and Schlieren techniques. These same kinds of techniques are applicable to the methods and systems of this invention and are also shown in FIG. 9. The Schlieren technique, as illustrated, involves a surface wave of continuous frequency but of zero amplitude adjacent the center frequency $f_o$ and of zero amplitude to one side of the center frequency. In the phase contrast technique the amplitude of the delay line signal is continuous, but the frequency is shifted adjacent the center frequency $f_o$. The frequency is step changed for a small region about the center frequency with this step change being a phase shift or $\pi/2$ or $3\pi/2$. It can be demonstrated for this case that a phase object is imaged with the image given by $$(18) \ |A|^2 \cong 1 + 2\Phi$$

Thus the variety of optical techniques used for imaging phase objects have their counterparts in applications of the present invention for acoustically, for example, imaging phase objects. All of the various techniques involve amplitude and/or phase modifications to the surface wave scan signal.

Figure 10:
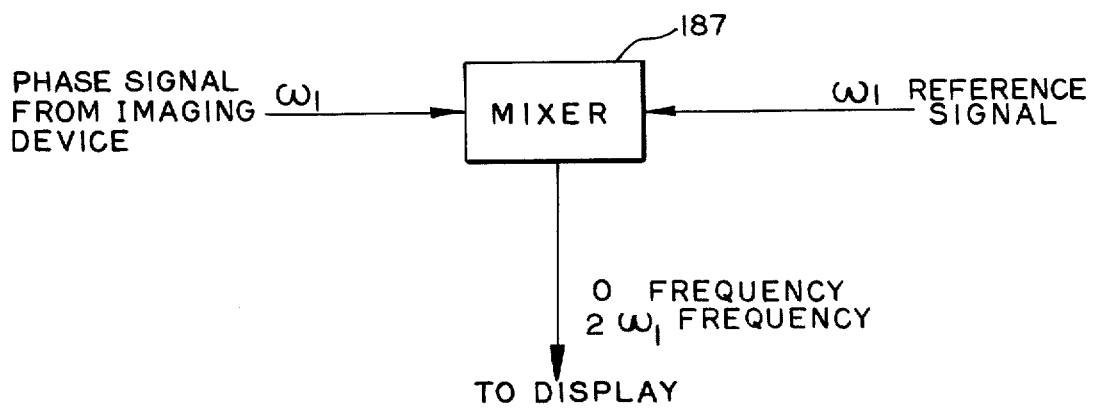
FIG. 10 is a schematic of apparatus for imaging phase objects in which the phase information is separated from amplitude background after detection of the image.

In accordance with one embodiment of this invention, phase objects can be imaged after they have been detected by one of the systems of this invention rather than during detection as discussed above. Referring to FIG. 10, there is schematically shown apparatus useful for such purpose. An additional mixer 187 is provided. The phase signal from the imaging system ($\omega_1$) is mixed with a reference signal of the same frequency ($\omega_1$). Sum and difference frequency signals are generated at the output of the mixer 187, with these sum and difference frequency signals being a signal of 0 frequency and a signal of $2\omega_1$ frequency. Typically, the 0 frequency signal is utilized. This 0 frequency signal contains only the phase shifted image information. Hence the phase object is imaged.

In imaging an irregular object utilizing the techniques of this invention different adjacent points on the object, which might for example be one-half wavelength apart, in reflecting acoustic waves will cause interference with one another. This does not occur when the object is illuminated with non-coherent radiation because adjacent point sources on the object will not have any common features. But the problem of this interference does exist when the object is illuminated, for example, with coherent acoustic energy, and can give rise to a speckle effect in the resultant image of the object. In accordance with one aspect of this invention, this interference effect can be eliminated. In the two dimensional imaging systems previously discussed herein, lines or rasters in space are sequentially scanned by the sequential signals applied to the tapped delay lines. Successive scans can be interlaced to avoid the interference problem discussed above. This interlace comprises simultaneously changing the frequency of the illuminating energy (acoustic energy, for example) and correspondingly changing the center frequency of the surface wave scan signal. This frequency change can be on the order of 1%, for example. The illuminating sound energy and the sweept rate of the surface wave scan signal are correspondingly changed between adjacent sweeps. This eliminates interference of the illuminating acoustic energy between adjacent points on the object. Inasmuch as in accordance with this invention the image output signal is the sum or difference of the frequency of the illuminating energy and the surface wave scan signal, of corresponding changes are made to the frequency of both no changes occur in their sum or difference.

An alternative to the interlace technique discussed above between successive scans, a type of noise modulation may be utilized. This technique operates in essentially the same manner except that the frequency of the illuminating energy and the center frequency of the scan signal are simultaneously very rapidly varied, but in step with one another. This also eliminates the coherence between illuminating energy present on adjacent points of the object and hence the interference effect.

Although the invention has been described with respect to specific embodiments, it should be apparent to those skilled in the art that various modifications may be made to the specific embodiments disclosed herein without departing from the true spirit and scope of the invention.

We claim:

1. A system for scanning an array of transducer elements of the type which convert impinging energy into corresponding electrical transducer signals, comprising:
   a plurality of mixers, one for each of the transducer elements;
   means coupling each of the transducer elements to its corresponding mixer;
   a delay line having a plurality of taps, one for each of said mixers,
   signal generating means for propagating one of various predetermined delay line signals down said delay line; and
   means for coupling each delay line tap to a corresponding mixer to produce output signal from those mixers at which a transducer and a delay signal coexist and to produce output signal with frequencies equivalent to the sum and different frequencies between said transducer signals and said delay line signals.

2. A system in accordance with claim 1 wherein said delay line comprises an acoustic delay line.

3. A system in accordance with claim 2 wherein said signal generating means generates a delay line signal having a spatial extent along said acoustic delay line less than the spacing between taps on said delay line so that the delay line signal is applied to only one of the delay line taps at a time.

4. A system in accordance with claim 2 wherein said signal generating means generates a delay line signal having a spatial extent along said acoustic delay line such that the delay line signal is simultaneously applied to all the taps thereof.

5. A system in accordance with claim 4 in which said taps of said acoustic delay line are evenly spaced therealong so that there is a linear variation in phase of the delay line signal from tap to tap.

6. A system in accordance with claim 4 in which said taps of said acoustic delay line are non-uniformly spaced according to a linear variation along the acoustic delay line so that there is a quadratic variation in phase of the delay line signal from tap to tap.

7. A method of scanning a plurality of transducer elements of the type which convert impinging energy into corresponding electrical transducer signals comprising the steps of coupling the electrical transducer signal output of each of the transducer elements to a corresponding mixer, propagating one of various predetermined delay line signals down a delay line of the type having a plurality of taps, one for each of the mixers, coupling the delay line signal at each of the delay line taps to a corresponding one of the mixers, summing the signals existing across all the individual mixers at an output terminal, and generating an output signal equivalent to the sum and difference frequencies between the transducer signals and the delay line signal from those mixers at which a transducer signal and a delay line signal from a tap on the delay line coexist.

8. A method in accordance with claim 7 wherein the delay line signal propagated down the delay line is an acoustic delay line signal and is formed to have a spatial extent along the delay line less than the spacing between taps on the delay line so that the delay line signal is sequentially applied to each of the delay line taps, one at a time, whereby a succession of the output signals are generated at the output terminal corresponding to and indicative of the presence of electrical transducer signals at the mixers.

9. A method in accordance with claim 7 wherein the delay line signal propagated down the delay line is an acoustic delay line signal and is formed to have a spatial extent along the delay line such that it simultaneously is applied to all the delay line taps, and including the step of applying a uniform plane wave energetic signal to the transducers so that a particular linear phase relationship is produced among the transducers which is coupled to the mixers, and including the further step of adjusting the frequency of the acoustic delay line signal applied to the delay line taps until a single large output signal is generated at the output terminal, the large output signal being indicative of phase correspondence between the transducer signal phase relationship and the phase relationship existing at the delay line taps for the acoustic delay line signal.

10. A method in accordance with claim 7 wherein the delay line signal propagated down the delay line is an acoustic delay line signal and is formed to have a spatial extent along the delay line such that it simultaneously is applied to all the delay line taps, and including the step of non-uniformly spacing the delay line taps with respect to each other in accordance with a linear relationship so that the phase relationship between the acoustic delay line signal as applied to the delay line taps varies quadratically, with the particular quadratic phase relationship varying with time as the delay line signal propagates down the delay line, with their being a large output at the output terminal whenever the quadratic phase relationship of the delay line signals at the delay line taps correspond to a quadratic phase relationship among the transducer signals.

11. A method in accordance with claim 7 wherein the delay line signal propagated down the delay line is an acoustic delay line signal and is formed to have spatial extent along the delay line such that it simultaneously is applied to all the delay line taps, and wherein the acoustic delay line signal has a varying frequency of the type $\omega = \omega_0 + \mu t$, so that the phase relationship between the acoustic delay line signal as applied to the delay line tap varies quadratically, with the particular quadratic phase relationship varying with time as the delay line signal propagates down the delay line, with their being a large output at the output terminal whenever the quadratic phase relationship of the delay line signals at the delay line taps correspond to a quadratic phase relationship among the transducer signal.

12. An electronically focused lens useful for scanning an energetic image and generating electrical signals descriptive of the energetic images position in space or for generating a focused energetic image in response to electrical signals comprising an array of transducer elements of the type which can convert impinging energy into corresponding electrical transducer signals or which can convert electrical transducer signals into radiating energy, a plurality of mixers, one for each of the transducer elements, means coupling each of said transducer elements to its corresponding mixer, a delay line having a plurality of taps, one for each of said mixers, means coupling each of said delay line taps to a corresponding mixer, propagation means for propagating a delay line signal down said delay line with the delay line signal having a spatial extent along said delay line so that it simultaneously is applied to all the taps, with said propagation means producing a quadratic phase distribution in the delay line signal from tap to tap with the particular quadratic phase distribution changing with time as the delay line signal propagates down the delay line, and means coupling said mixers at a common terminal.

13. An electronically focused lens in accordance with claim 12 wherein said delay line is an acoustic delay line and said propagation means includes means for coupling a constant frequency signal into said delay line and wherein said delay line taps are non-uniformly spaced with respect to each other in accordance with a linear relationship so that a quadratic phase distribution is produced in the delay line signal from tap to tap.

14. An electronically focused lens in accordance with claim 12 wherein said delay line is an acoustic delay line and said delay line taps are evenly spaced and said propagation means includes means for coupling a signal into said delay line having a frequency of the type $\omega = \omega_0 + \mu t$ so that a quadratic phase distribution is produced in the delay line signal from tap to tap.

15. An electronically focused lens in accordance with claim 12 used for generating a focused energetic image in response to electrical signals and including a selectively energizable signal source coupled to said common terminal for said mixers whereby a transmitting signal can be coupled to all the mixers at a predetermined time with respect to the varying quadratic phase distribution of the delay line signals at the delay line taps so that the mixers generate electrical signals having a predetermined quadratic phase distribution from mixer to mixer which are respectively applied to said transducer elements for radiating energy focused at a particular point in space.

16. An electronically focused lens for scanning an energetic image and generating electrical signals descriptive of the spatial position of the energetic image comprising a plurality of transducer elements of the type which convert impinging energy into corresponding electrical transducer signals, a plurality of mixers, one for each of the transducer elements, means coupling each of said transducer elements to its corresponding mixer, an acoustic delay line having a plurality of evenly spaced delay line taps, one for each of said mixers, means coupling each of said delay line taps to a corresponding mixer, propagation means for propagating a delay line signal down said acoustic delay line with the delay line signal having a varying frequency of the type $\omega = \omega_0 + \mu t$ and having a spatial extent along said acoustic delay line so that it simultaneously is applied to all the delay line taps whereby a quadratic phase distribution is produced in the delay line signal from tap to tap, with the quadratic phase distribution changing with time as the delay line signal propagates down the acoustic delay line, means commonly coupling the mixers at an output terminal so that signals appearing across the mixers are summed, with output signals being generated by the mixers at the sum and difference frequencies of the transducer signals and the signals applied to the mixers from the delay line taps, whereby a substantially large output at said output terminal is produced only when the quadratic phase distribution of the delay line signals applied to the mixers by the delay line taps corresponds to a quadratic phase distribution of the electrical transducer signals applied to the mixers from said transducer elements.

17. An electronically focused lens in accordance with claim 16 wherein the focal length of the lens is varied by varying the delay line signal which is of the form $\omega = \omega_0 + \mu t$ by varying the quantity $\mu$.

18. An electronically focused lens in accordance with claim 16 wherein said transducer elements are acoustic transducer elements.

19. An electronically focused lens in accordance with claim 16 including filter means connected to said output terminal for separating signals of a particular frequency range at said output terminal from other signals present at said output terminal.

20. An electronically focused lens for scanning an energetic image and generating electrical signals descriptive of the spatial position of the energetic image comprising a transducer of the type which converts impinging energy into co-responding electrical transducer signals, said transducer extending along an $x$ axis and a $y$ axis so that it is two dimensional, said transducer having a first set of spaced parallel electrical contacts extending across the transducer parallel to the $x$ axis and a second set of spaced parallel electrical contacts extending across the transducer parallel to the $y$ axis, a first acoustic delay line having a plurality of spaced taps, means coupling each of the first acoustic delay line taps to one of the spaced parallel electrical contacts parallel to the $x$ axis, a second acoustic delay line having a plurality of spaced taps, means coupling each of the second acoustic delay line taps to one of the spaced parallel electrical contacts parallel to the $y$ axis, means for propagating a first acoustic delay line signal down said first acoustic delay line, means for propagating a second acoustic delay line signal down said second acoustic delay line, both said first and second acoustic delay line signals having a spatial extent along their respective delay lines so as to be simultaneously present at all the taps of their respective delay lines, and both said first and second delay line signals having a frequency of the form $\omega = \omega_0 + \mu t$ so that a quadratic phase distribution is produced along the taps at their respective delay lines, one of said means coupling either each of the first acoustic delay line taps or the second acoustic delay line taps to the corresponding spaced parallel electrical contacts including a plurality of mixers, one for each of the delay line taps being so coupled, each of said first and second acoustic delay lines having means coupling the delay line taps thereon to a common terminal with the scanned output of the electronically focused lens appearing between the common terminals.

21. An electronically focused lens in accordance with claim 20 wherein said transducer is an acoustic transducer.

22. An electronically focused lens in accordance with claim 20 wherein both said first and second acoustic delay line signals have a signal width greater than the length of their respective acoustic delay line so as to produce time varying quadratic phase distributions at the taps of the respective delay lines which sequentially correspond to quadratic phase distributions on said transducer due to energetic image sources at a succession of spatial points.

23. An electronically focused lens in accordance with claim 22 wherein both said first and second delay line signals are propagated down their respective delay lines at the same time so that a raster scan of the energetic image impinging on the transducer is generated.

24. An electronically focused lens in accordance with claim 23 wherein one of said first and second acoustic delay line signals is initially propagated at a time $t = t_1$ and other of said delay line signals is propagated at a later time $t = t_1 + \tau$.

25. An electronically focused lens in accordance with claim 24 including means for sequentially generating a plurality of pairs of first and second delay line signals and including means for sequentially varying the time relationship $\tau$ between the sequentially generated pairs so that a two dimensional raster scan of the energetic image impinging upon said transducer is generated.

26. A method in accordance with claim 7 wherein the delay line signal propagated down the delay line is an acoustic delay line signal and is formed to have a spatial extent along the delay line such that it simultaneously is applied to all the delay line taps, and wherein the acoustic delay line signal has a varying frequency of the type given by two or more terms of the expansion $$\omega = \omega_o + \mu t - \frac{1}{2}\frac{\mu^2}{kd_o}t^3 + \frac{3}{8}\frac{\mu^3}{k^2d_o^2}t^5 - \frac{5}{16}\frac{\mu^4}{k^3d_o^3}t^7 + \ldots$$

so that the phase relationship between the acoustic delay line signal as applied to the delay line taps is of the same form as the phase relationship among the plurality of transducer elements, with the particular phase relationship among the delay line taps varying with time as the delay line signal propagates down the delay line, with their being a large output at the output terminal whenever the phase relationship of the delay line signals at the delay line taps correspond to a phase relationship among the transducer signals.

27. An electronically focused lens for scanning an energetic image and generating electrical signals descriptive of the spatial position of the energetic image comprising a two dimensional array of transducers of the type which convert impinging energy into corresponding electrical transducer signals, said two dimensional array comprising N contiguous one dimensional arrays each having the same number of discrete transducer elements, a plurality of sets of mixers, one for each of the N one dimensional arrays, each set of mixers comprising a plurality of mixers, one for each individual transducer element in the associated array with the output of each transducer element coupled across its corresponding mixer, a plurality of tapped delay lines, one for each of the N one dimensional arrays, each of said delay lines having a plurality of taps, one for each of the individual transducer elements in its associated array with each of said taps being coupled across the mixer for its individual transducer element, signal generating means for simultaneously applying a signal to all of the delay lines associated with the N one dimensional arrays, summing means associated with each of the sets of mixers for developing sum signals of the signals across the individual mixers in each of the sets; an additional distinct set of mixers having a plurality of mixers, one for each of the one dimensional transducer arrays, with the sum signal of the signals across the individual mixers in the set of mixers associated with each array being coupled across the corresponding mixers of said additional distinct set, an additional distinct tapped delay line having a plurality of taps, one for each of the mixers in said additional distinct set of mixers, with each of said taps being coupled across its corresponding mixer in said additional distinct set, additional signal generating means for applying a signal to said additional distinct delay line, and output means for summing the signals present at the plurality of mixers of said additional distinct set of mixers.

28. An electronically focused lens in accordance with claim 27 including timing means coupled to said signal generating means and said additional signal generating means for successively varying the time relationship between the signal generated by said signal generating means and the signal generated by said additional signal generating means.

29. An electronically focused lens in accordance with claim 27 wherein said tapped delay lines comprise acoustic delay lines and wherein the signals applied to said tapped delay lines have a frequency varied in such a manner that the phase distribution of the signals among the taps of said delay lines is of the same form as the phase distribution among the plurality of transducer elements.

30. An electronically focused lens for scanning an energetic image and generating electrical signals descriptive of the spatial position of the energetic image comprising a twodimensional array of transducers of the type which convert impinging energy into corresponding electrical transducer signals, said two dimensional array comprising N contiguous one dimensional arrays each having the same number of discrete transducer elements, a plurality of sets of mixers, one for each of the N one dimensional arrays, each set of mixers comprising a plurality of mixers, one for each individual transducer element in the associated array with the output of each transducer element coupled across its corresponding mixer, a tapped delay line having a plurality of taps, one for each of the individual transducer elements in a one dimensional array, each of the delay line taps being coupled to one of the mixers in every one of the sets of mixers, signal generating means for applying a signal to said tapped delay line, summing means associated with each of the sets of mixers for developing sum signals of the signals across the individual mixers in each of the sets; an additional distinct set of mixers having a plurality of mixers, one for each of the one dimensional arrays, with the sum signal of the signals across the individual mixers in the set of mixers associated with each array being coupled across the corresponding mixer of said additional distinct set, an additional distinct tapped delay line having a plurality of taps, one for each of the mixers in said additional distinct set of mixers, with each of said taps being coupled across its corresponding mixer in said additional distinct set, additional signal generating means for applying a signal to said additional distinct delay line, and output means for summing the signals present at the plurality of mixers of said additional distinct set of mixers.

31. An electronically focused lens in accordance with claim 30 including timing means coupled to said signal generating means and said additional signal generating means for successively varying the time relationship between the signal generated by said signal generating means and the signal generated by said additional signal generating means.

32. An electronically focused lens in accordance with claim 30 wherein said tapped delay line and said additional tapped delay line comprise acoustic delay lines and wherein the signals applied to said tapped delay lines have a frequency varied in such a manner that the phase distribution of the signals among the taps of said delay lines is of the same form as the phase distribution among the plurality of transducer elements.

33. A method for imaging an object comprising the steps of illuminating the object with energy whereby the illuminating energy is scattered and reflected by the object, detecting the scattered and reflected illuminating energy with an array of transducers which generate electrical transducer signals corresponding to the energy impinging thereon, with their being a particular phase distribution among the electrical transducer signals corresponding to energy scattered and reflected from each point on the object, propagating a signal along a tapped delay line with the delay line signal having a time-varying phase distribution from tap to tap on the delay line substantially of the same form as the particular phase distribution of the electrical transducer signals with the time variation of the tap to tap phase distribution successively corresponding to phase distributions among the transducer electrical signals for different points on the object, mixing the signal from each transducer element with a signal from a delay line tap to form a plurality of mixed signals, and summing the mixed signals to form an output signal containing image information for the object.

34. A method in accordance with claim 33 in which the signal propagated along the delay line has its frequency time varied in an approximately linear fashion from an initial frequency through a center frequency $f_o$ to a final frequency to perform a scan along a line of the object.

35. A method in accordance with claim 34 wherein only a relatively small proportion of the energy incident on the object is scattered by the object and including the step of reducing image information in the output signal corresponding to unscattered energy from the object by suppressing that portion of the signal propagated along the delay line which functions to image unscattered energy.

36. A method in accordance with claim 35 wherein a portion of the delay line signal is suppressed by reducing the amplitude of the delay line signal for a relatively narrow frequency band adjacent to both sides of and including the center frequency $f_o$.

37. A method in accordance with claim 35 wherein a portion of the delay line signal is suppressed by reducing the amplitude of the delay line signal to zero for all frequencies between the center frequency $f_o$ and the final frequency and also for a narrow band of frequency adjacent the center frequency between the center frequency and the initial frequency.

38. A method in accordance with claim 35 wherein a portion of the delay line signal is suppressed by phase shifting a narrow frequency band of the delay line signal adjacent to either side of and including the center frequency $f_o$.

39. A method in accordance with claim 38 wherein the narrow frequency band is phase shifted by $\pi/2$.

40. A method in accordance with claim 38 wherein the narrow frequency band is phase shifted by $3\pi/2$.

41. A method in accordance with claim 34 wherein only a relatively small proportion of the energy incident on the object is scattered by the object and including the step of reducing image information in the output signal corresponding to unscattered energy from the object by mixing the output signal with a reference signal having the same frequency as the output signal so that the difference frequency resulting from the mixing comprises phase variation information corresponding to energy scattered by the object.

42. A method in accordance with claim 34 including the step of interlacing successive scans of lines of the object by modulating the illuminating energy for the object and correspondingly modulating the signal propagated along the delay line.

43. A method in accordance with claim 42 wherein the modulation of the signal propagated along the delay line and the illuminating energy comprises a corresponding step change in frequency for both from scan to scan.

44. A method in accordance with claim 42 wherein the modulation of the signal propagated along the delay line and the illuminating energy comprises corresponding changes in frequency of both during a scan.

* * * * *